(No Model.)

E. WARWICK.
WHEEL RIM.

No. 530,736. Patented Dec. 11, 1894.

Witnesses:
Thomas M. Smith.
Richard C. Maxwell.

Inventor.
Edward Warwick,
By J. Walter Douglass.
Attorney.

UNITED STATES PATENT OFFICE.

EDWARD WARWICK, OF BIRMINGHAM, ENGLAND.

WHEEL-RIM.

SPECIFICATION forming part of Letters Patent No. 530,736, dated December 11, 1894.

Application filed December 6, 1893. Serial No. 492,914. (No model.) Patented in England September 14, 1893, No. 17,307.

*To all whom it may concern:*

Be it known that I, EDWARD WARWICK, a subject of the Queen of Great Britain, residing at Aston, Birmingham, England, have invented certain new and useful Improvements in Wheel-Rims, (for which I have obtained British Letters Patent No. 17,307, dated September 14, 1893,) of which the following is a specification.

My invention has relation in general to rims for wheels; and more particularly to the construction and arrangement thereof.

The principal object of my invention is to provide a durable and efficient wheel rim for the reception of a solid, cushion or similar form of tire adapted for use in connection with bicycles, tricycles and similar rolling vehicles.

My invention consists of a wheel rim constructed, arranged and adapted for a tire in substantially the manner hereinafter described and claimed.

The nature and general features of my invention will be more fully understood from the following description taken in connection with the accompanying drawings forming part hereof; and in which—

Figure 2:
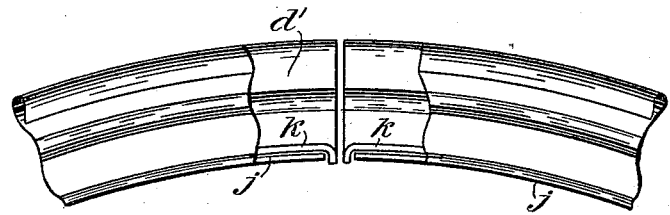
Figure 3:
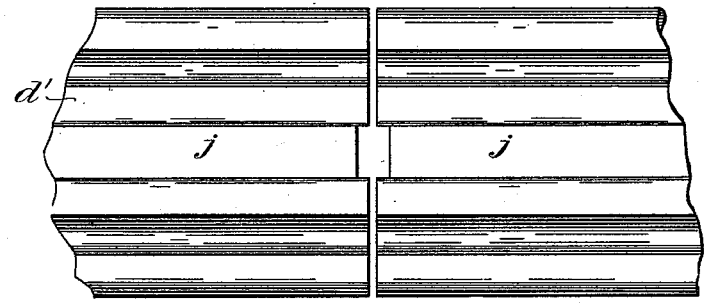
Figure 4:
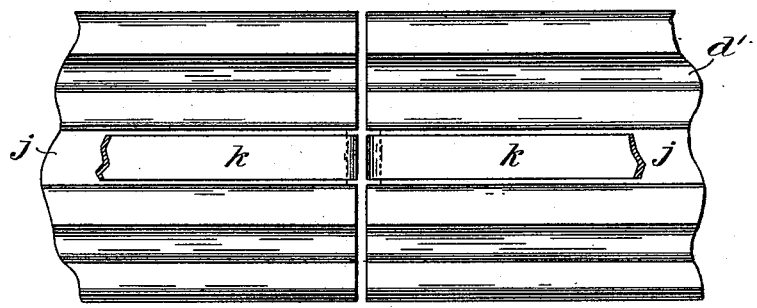
Figure 1:
Figure 5:
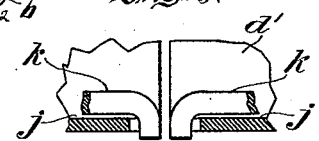

Figure, 1 is a transverse sectional view of a wheel rim embodying the features of my invention, and showing a longitudinal strip mounted in the apex thereof and forming a thickened portion for the reception of the heads of spokes. Fig. 2, is a longitudinal section through the same. Fig. 3, is a plan view, showing the loose strip removed forming a thickened portion within the rim for receiving the heads of spokes. Fig. 4, is a similar view of the rim, showing the loose strip forming a thickened portion within the rim for receiving the heads of spokes in position; and Fig. 5, is a sectional view of a broken off portion of the rim of Fig. 2, showing the ends of the longitudinal strip turned inward and the hoop portion of the rim closed over the ends thereof.

Referring to the drawings, a rim for a wheel of my invention, comprises a corrugated and tapering tire shell $d$, having the free extremities thereof bent over to form channels $d'$ and $d^2$, and into which channels are inserted wires for strengthening the ends of the shell thereat on the respective sides thereof. In the apex portion of the shell $d$, is formed a channel or recess $j$, for the reception of a strip $k$, loosely mounted therein and forming a thickening portion within the rim adapted to receive the heads of spokes, not shown.

The mode of producing a rim of the type illustrated in the drawings is carried into effect in the following manner:—From a long strip a piece is cut the required length to constitute the rim. It is then formed into a round hoop and at the junction or meeting ends of the hoop, the ends of the loose strip $k$, are turned preferably inward, and the ends of the hoop thus formed are closed over the ends of the strip $k$, thereby forming a thickened portion within the rim suitable to receive the heads of spokes, not shown.

Having thus described the nature and objects of my invention, what I claim as new, and desire to secure by Letters Patent, is—

A wheel rim, comprising a strip of metal formed into a hoop having the meeting ends thereof engaged by a strip $k$, the ends of which are turned inward so as to be embraced by said hoop ends which are bent over the same and the said metal strip so bent as to form a rectangular recess or trough within the rim for the reception of the spokes of a wheel and the flaring surfaces of said bent metal strip having straight portions merging with arched surfaces reversely arranged with respect to each other and terminating in the outer ends of the formed rim in tubular channels having strengthening bars inserted therein and supported thereby in the manner shown and described and for the purposes set forth.

In testimony whereof I have hereunto set my signature in the presence of two subscribing witnesses.

EDWARD WARWICK.

Witnesses:
ALF. WM. TURNER,
ISAAC MARKS.